US008925070B2

(12) United States Patent
Sriraghavan et al.

(10) Patent No.: US 8,925,070 B2
(45) Date of Patent: Dec. 30, 2014

(54) METHOD AND APPARATUS FOR PROVIDING USER AUTHENTICATION BASED ON USER ACTIONS

(75) Inventors: Priyanka G. Sriraghavan, Tamil Nadu (IN); Lakshmi Nrusimhan N. V., Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 499 days.

(21) Appl. No.: 12/640,309

(22) Filed: Dec. 17, 2009

(65) Prior Publication Data

US 2011/0154444 A1 Jun. 23, 2011

(51) Int. Cl.
*G06F 21/00* (2013.01)
*H04L 9/32* (2006.01)
*G06F 3/0488* (2013.01)
*G06F 21/36* (2013.01)

(52) U.S. Cl.
CPC ............ *G06F 21/36* (2013.01); *G06F 3/04883* (2013.01)
USPC ............................................ 726/19; 713/183

(58) Field of Classification Search
CPC ......... G06F 21/36; G06F 21/31; G06F 21/32; G06F 3/04887; G06F 3/0488; G06F 3/0487; H04L 63/08; H04L 63/083; H04L 63/0861; H04L 9/3226; H04L 9/321; H04L 9/32; H04L 9/3231
USPC .......................... 726/17, 16, 19; 713/183, 182
See application file for complete search history.

(56) References Cited

U.S. PATENT DOCUMENTS

| | | | | |
|---|---|---|---|---|
| 5,293,424 A * | 3/1994 | Holtey et al. | .................. | 713/193 |
| 5,559,961 A * | 9/1996 | Blonder | .......................... | 726/18 |
| 5,715,487 A * | 2/1998 | McIntyre et al. | ............. | 396/299 |
| 5,721,780 A * | 2/1998 | Ensor et al. | ................... | 713/155 |
| 5,832,211 A * | 11/1998 | Blakley et al. | .................... | 726/6 |
| 6,169,787 B1 * | 1/2001 | Shimada et al. | ........... | 379/91.01 |
| 6,356,868 B1 * | 3/2002 | Yuschik et al. | ............... | 704/246 |
| 6,421,453 B1 * | 7/2002 | Kanevsky et al. | ............ | 382/115 |
| 6,464,585 B1 * | 10/2002 | Miyamoto et al. | .............. | 463/35 |
| 6,539,479 B1 * | 3/2003 | Wu | ................................ | 713/151 |
| 6,718,471 B1 * | 4/2004 | Kashima | ........................... | 726/9 |
| 6,720,860 B1 * | 4/2004 | Narayanaswami | .......... | 340/5.54 |
| 6,735,695 B1 * | 5/2004 | Gopalakrishnan et al. | ... | 713/186 |
| 6,941,001 B1 * | 9/2005 | Bolle et al. | ...................... | 382/124 |
| 7,243,239 B2 * | 7/2007 | Kirovski et al. | ............. | 713/184 |
| 7,418,392 B1 * | 8/2008 | Mozer et al. | .................. | 704/275 |

(Continued)

FOREIGN PATENT DOCUMENTS

EP           677801 A1 * 10/1995
WO   WO 2009145540 A2 * 12/2009

OTHER PUBLICATIONS

"Menu Icon with Hidden Geometrical Password", IBM Technical Disclosure Bulletin, vol. 32, No. 10B, Mar. 1990. pp. 463-464.*
T-Mobile G1 User Manual. May 27, 2009. 113 pgs.*

*Primary Examiner* — Zachary A Davis

(57) ABSTRACT

An approach is provided for authenticating using user actions. A prompt is initiated on a display for an input to authenticate a user. The input is received as a sequence of user actions on the display. A predetermined sequence associated with the user is retrieved. The received sequence is compared with the predetermined sequence to determine a match. The user is declared to be authenticated based on the comparison.

20 Claims, 12 Drawing Sheets

(56) References Cited

U.S. PATENT DOCUMENTS

| | | | |
|---|---|---|---|
| 7,451,323 B2* | 11/2008 | Abe et al. | 713/183 |
| 7,552,467 B2* | 6/2009 | Lindsay | 726/5 |
| 7,593,000 B1* | 9/2009 | Chin | 345/156 |
| 7,657,849 B2* | 2/2010 | Chaudhri et al. | 715/863 |
| 7,679,601 B2* | 3/2010 | Chang et al. | 345/156 |
| 7,698,563 B2* | 4/2010 | Shin | 713/184 |
| 7,730,081 B2* | 6/2010 | Bromm et al. | 707/769 |
| 7,843,425 B2* | 11/2010 | Lu et al. | 345/156 |
| 7,849,323 B2* | 12/2010 | Field et al. | 713/184 |
| 7,876,239 B2* | 1/2011 | Horstemeyer | 340/994 |
| 8,106,744 B2* | 1/2012 | Petrovic et al. | 340/5.28 |
| 8,117,458 B2* | 2/2012 | Osborn et al. | 713/183 |
| 8,176,332 B2* | 5/2012 | Drake | 713/184 |
| 8,214,892 B2* | 7/2012 | Cohen et al. | 726/19 |
| 8,225,343 B2* | 7/2012 | Miller, IV | 725/12 |
| 8,336,086 B2* | 12/2012 | Seo | 726/5 |
| 8,366,544 B2* | 2/2013 | Walker et al. | 463/29 |
| 8,423,076 B2* | 4/2013 | Kim et al. | 455/550.1 |
| 8,482,678 B2* | 7/2013 | Sun et al. | 348/734 |
| 8,601,589 B2* | 12/2013 | Blagsvedt et al. | 726/26 |
| 8,683,582 B2* | 3/2014 | Rogers | 726/21 |
| 8,788,838 B1* | 7/2014 | Fadell et al. | 713/186 |
| 2004/0030934 A1* | 2/2004 | Mizoguchi et al. | 713/202 |
| 2006/0224456 A1* | 10/2006 | Walker et al. | 705/14 |
| 2008/0201578 A1* | 8/2008 | Drake | 713/172 |
| 2010/0287382 A1* | 11/2010 | Gyorffy et al. | 713/185 |
| 2011/0016520 A1* | 1/2011 | Cohen et al. | 726/19 |

* cited by examiner

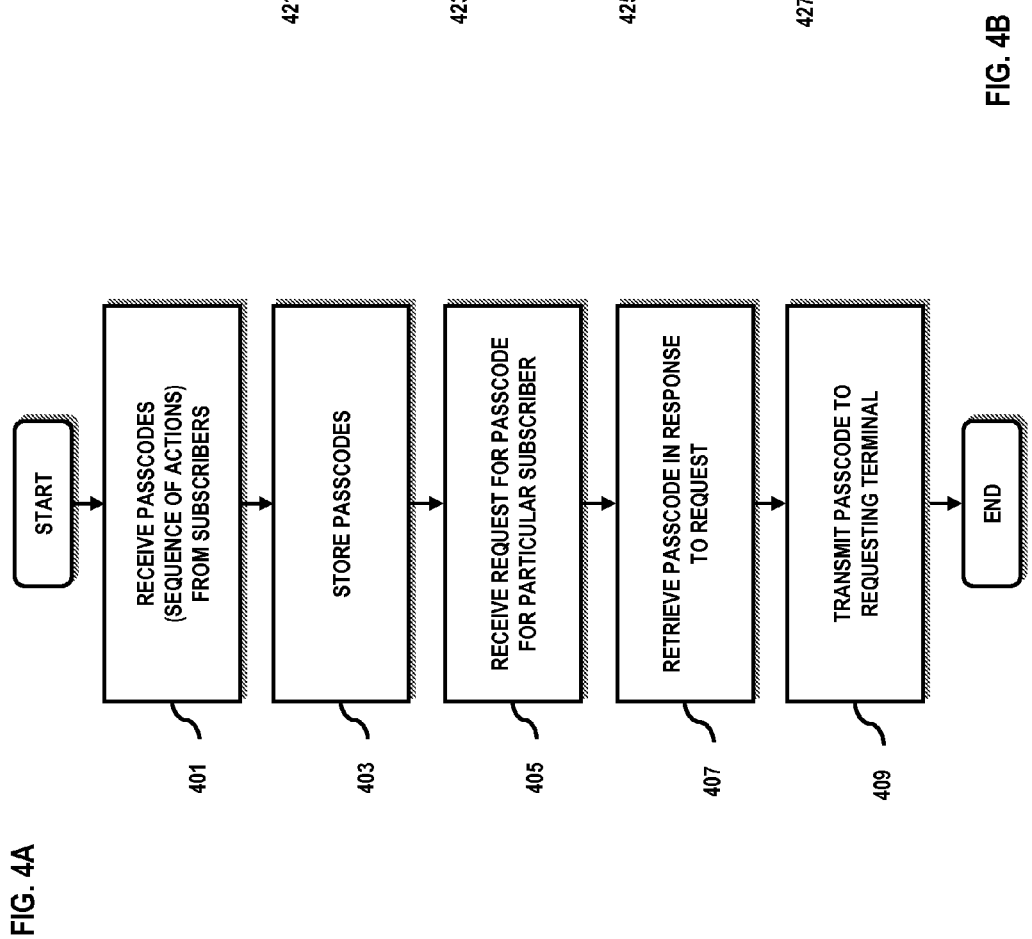

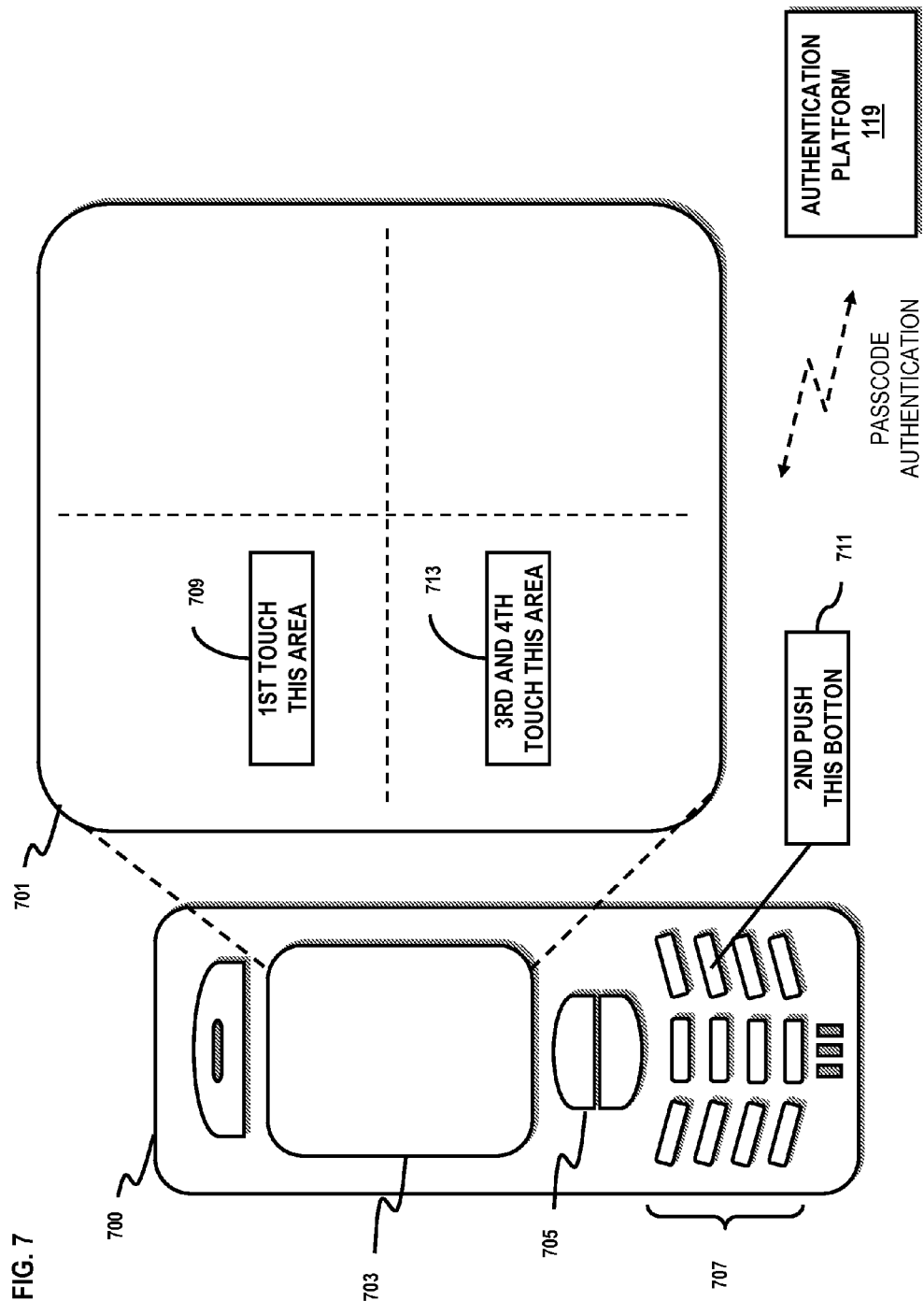

METHOD AND APPARATUS FOR PROVIDING USER AUTHENTICATION BASED ON USER ACTIONS

BACKGROUND INFORMATION

Given the reliance on computers, computing devices (e.g., cellular telephones, laptop computers, personal digital assistants, and the like), and automated systems (e.g., automated teller machines, kiosks, etc.) to conduct secure transactions and or access private data, user authentication is critical. Traditional approaches to user authentication involve utilizing user identification and passwords, which comprise alphanumeric characters. Unfortunately, text-based passwords are susceptible to detection by on-lookers if the password is overly simplistic or "weak." It is noted, however, that "strong" passwords—i.e., passwords that are difficult to reproduce by unauthorized users—are also difficult for the users who created them to remember. Consequently, users generally do not create such "strong" passwords. Moreover, it is not uncommon that users employ only a limited number of passwords for the many applications requiring passwords. In short, authentication mechanisms that rely on traditional text-based passwords can pose significant security risks.

Therefore, there is a need for an approach that can generate passwords that are strong, but are relatively easy to recall and input.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4A and 4B are flowcharts of processes for providing authentication services, according to an exemplary embodiment;

FIG. 7 is a diagram of a mobile device with a touch screen display capable of providing user authentication, according to an exemplary embodiment.

DESCRIPTION OF THE PREFERRED EMBODIMENT

A preferred apparatus, method, and software for authenticating based on user actions are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to "cursor" actions, it is contemplated that various exemplary embodiments are also applicable to other non-text based activities.

Figure 1:
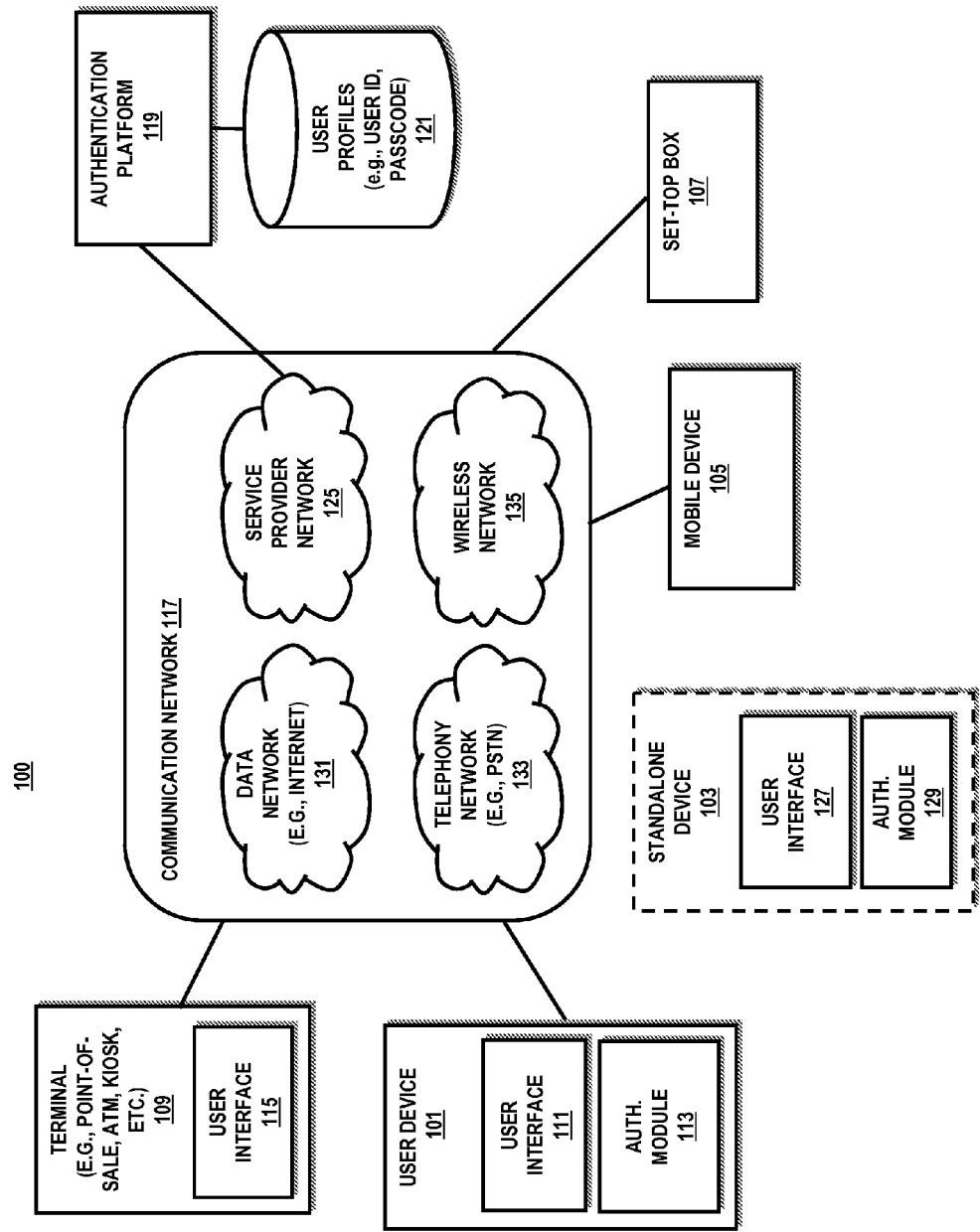
FIG. 1 is a diagram of a system capable of authenticating using user actions, according to an exemplary embodiment.

FIG. 1 is a diagram of a system capable of authenticating using user actions, according to an exemplary embodiment. For the purpose of illustration, system 100 includes various devices 101-109, each of which is configured to provide user authentication based on unique user actions (e.g., cursor actions and optionally in conjunction with text characters). As used herein, "user actions" refer to not-solely-text-based or non-text based input; e.g., audio input or cursor movement along with selection of an area represented within a graphical display. Such user action can serve as a passcode to verify the identity of or otherwise authenticate the user. In this example, user device 101 includes a user interface 111, which in one embodiment, is a graphical user interface (GUI) that is presented on a display (not shown) on the device 101 for capturing actions, e.g., cursor actions, input by the user. As shown, an authentication module 113 can reside within the user device 101 to verify the series of user actions with a stored sequence or pattern of actions designated for the particular user. In contrast, traditional passwords (that are utilized for login password for logging into a system) are based on entering alphanumeric characters using a keyboard. In contrast, the approach of system 100 can authenticate without using text (which also means, without a keyboardkeypad), thereby allowing greater deployment, particularly with devices that do not possess a sufficiently large form factor to accommodate a keyboard.

By way of example, the user device 101 can be any type of computing device including a cellular telephone, smart phone, a laptop computer, a desktop computer, a web-appliance, a personal digital assistant (PDA), and etc. Also, the approach for authenticating users, as described herein, can be applied to other devices, e.g., terminal 109, which can include a point -of-sale terminal, an automated teller machine, a kiosk, etc. In this example, terminal 109 has a user interface 115 that permits users to enter a sequence of actions, whereby the terminal 109 can transport the sequence over a communication network 117 for user verification by an authentication platform 119. The authentication platform 119 maintains a user profile database 121 that is configured to store passcodes along with the user identification (ID) of subscribers to the authentication service, according to one embodiment. Users may establish one or more sub-profiles including user-names, passwords, codes, personal identification numbers (PINs), etc. relating to user authentication as well as user accounts and preferences. While user profiles repository 121 is depicted as an extension of service provider network 125, it is contemplated that user profiles repository 121 can be integrated into, collocated at, or otherwise in communication with any of the components or facilities of system 100.

Moreover, database 121 may be maintained by a service provider of the authentication platform 119 or may be maintained by any suitable third-party. It is contemplated that the physical implementation of database 121 may take on many forms, including, for example, portions of existing repositories of a service provider, new repositories of a service provider, third-party repositories, and/or shared-repositories. As such, database 121 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when database 121 is provided in distributed fashions, information and content available via database 121 may be located utilizing any suitable querying technique, such as electronic number matching, distributed universal number discovery (DUNDi), uniform resource identifiers (URI), etc.

In one embodiment, terminal 109 can be implemented to include an authentication module, similar to that of the user device 101. Other devices can include a mobile device 105, or even a set-top box 107. Moreover, the authentication approach can be deployed within a standalone device 103; as such, the device 103 utilizes a user interface 127 that operates with an authentication module 129 to permit access to the resources of the device 103, for instance. By way of example, the standalone device 103 can include an automated teller machine (ATM), a kiosk, a point-of-sales (POS) terminal, a vending machine, etc.

Communication network 117 may include one or more networks, such as data network 131, service provider network 125, telephony network 133, and/or wireless network 135. As seen in FIG. 1, service provider network 125 enables terminal 109 to access the authentication services of platform 119 via communication network 117, which may comprise any suitable wireline and/or wireless network. For example, telephony network 133 may include a circuit-switched network, such as the public switched telephone network (PSTN), an integrated services digital network (ISDN), a private branch exchange (PBX), or other similar networks. Wireless network 135 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 131 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 125 and 131-135 may be completely or partially contained within one another, or may embody one or more of the aforementioned infrastructures. For instance, service provider network 125 may embody circuit-switched and/or packet-switched networks that include facilities to provide for transport of circuit-switched and or packet-based communications. It is further contemplated that networks 125 and 131-135 may include components and facilities to provide for signaling and/or bearer communications between the various components or facilities of system 100. In this manner, networks 125 and 131-135 may embody or include portions of a signaling system 7 (SS7) network, or other suitable infrastructure to support control and signaling functions. While specific reference will be made hereto, it is contemplated that system 100 may embody many forms and include multiple and/or alternative components and facilities.

It is observed that the described devices 101-109 can store sensitive information as well as enable conducting sensitive transactions, and thus, require at minimum the ability to authenticate the user's access to these resources. As mentioned, traditional passwords are text-based and can readily compromise security as most users tend to utilize "weak" passwords because they are easy to remember.

Therefore, the approach of system 100, according to certain exemplary embodiments, stems from the recognition that non-text based methods are more difficult to replicate, and thus, are more likely to produce "strong" passwords with relatively more ease. That is, the user may remember a sequence of motions more than a complex sequence of alphanumeric characters. For example, the user may identify the series of actions along a display screen with a favorite pattern of movements associated with a particular sport, a video game, musical notes, etc.

Figure 2:
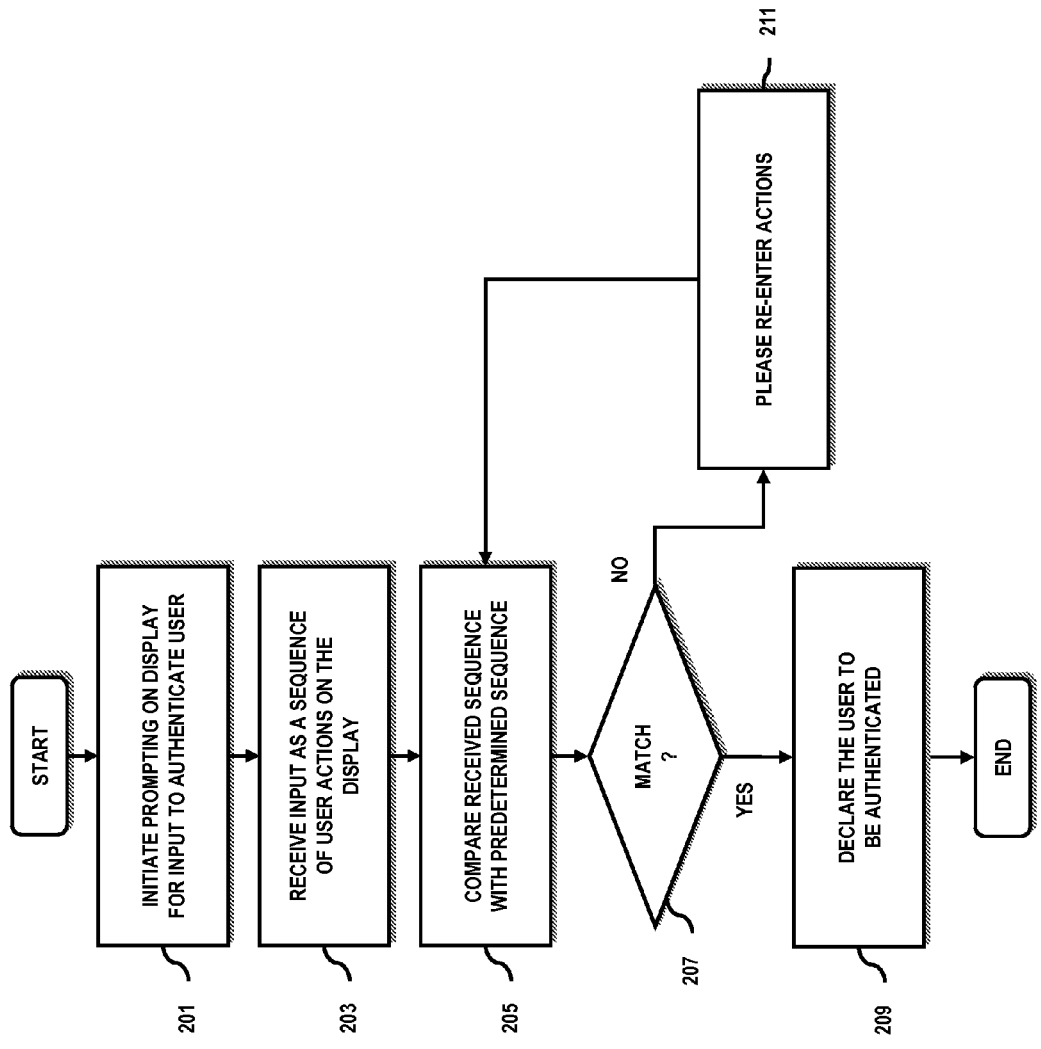
FIG. 2 is a flowchart of a process for authenticating a user through user actions, according to an exemplary embodiment.

FIG. 2 is a flowchart of a process for authenticating a user through user actions, according to an exemplary embodiment. By way of example, this authentication process is explained with respect to user device 101. In step 201, a prompt is provided on the display of the user device 101 indicating to the user that a user ID and passcode is needed. After the user ID is provided using either a physical or soft key board, the user enters a passcode that comprises a sequence of user actions, as in step 203. For example, the user can utilize a cursor controller, e.g., a mouse or touch pad, to select various areas within the display by clicking. Thus, an example of a passcode (or password) can be a series of mouse clicks (left, right or both), or even a combination of mouse-clicks and key presses. Two examples are as follows:

EXAMPLE 1

Password=1 left click+3 right clicks+2 left clicks

EXAMPLE 2

Password=2 left clicks+the letter 'v'+1 right-click+the symbol '$'

In addition to the above examples, the authentication process can track the clicking (or selecting) of an "area of the screen," using a mouse or the like. According to one embodiment, the display areas are partitioned into sections (which may or may not be visually indicated) so that the series of the selection of these areas constitute the passcode. Also, other actions can be interspersed into this sequence; for example, a right click or left click of the mouse can be indicated as part of the sequence, as well as standard text-based characters. It is noted that during the passcode creation process, the user can be notified whether the sequence of user actions constitute a "strong" or "weak" passcode. For instance, a single click of the mouse in the middle of the screen would be a weak passcode; in which case, the user may be asked to enter another sequence.

Next, in step 205, the specified sequence is compared with a predetermined sequence for the particular user. It is noted that this predetermined sequence could have been previously created using the user device 101, or alternatively created using another device, e.g., the user's mobile phone or set-top box (which may transfer the predetermined sequence to the authentication module 113 of the user device 101 using a wireless or wired connection). If the process determines that there is a match, per step 207, then the process declares the user to be an authorized user (step 209). Otherwise, the process can request that the user re-enter the passcode by performing the sequence of actions again (step 211). According to one embodiment, the process may only allow the user to enter the passcode unsuccessfully after a predetermined number of attempts. For example, the process may lock the user out after three unsuccessful tries.

As mentioned, the above process has applicability in a number of applications that require authentication of the user. For example, this non-text based authentication process can be incorporated into the operating system of a computer. Also, this process can be utilized at point-of-sale terminals for users to conduct commercial transactions. According to another embodiment, user authentication can be deployed within a set-top box to, for example, verify the user's identity for purchasing on-demand content.

Figure 3:
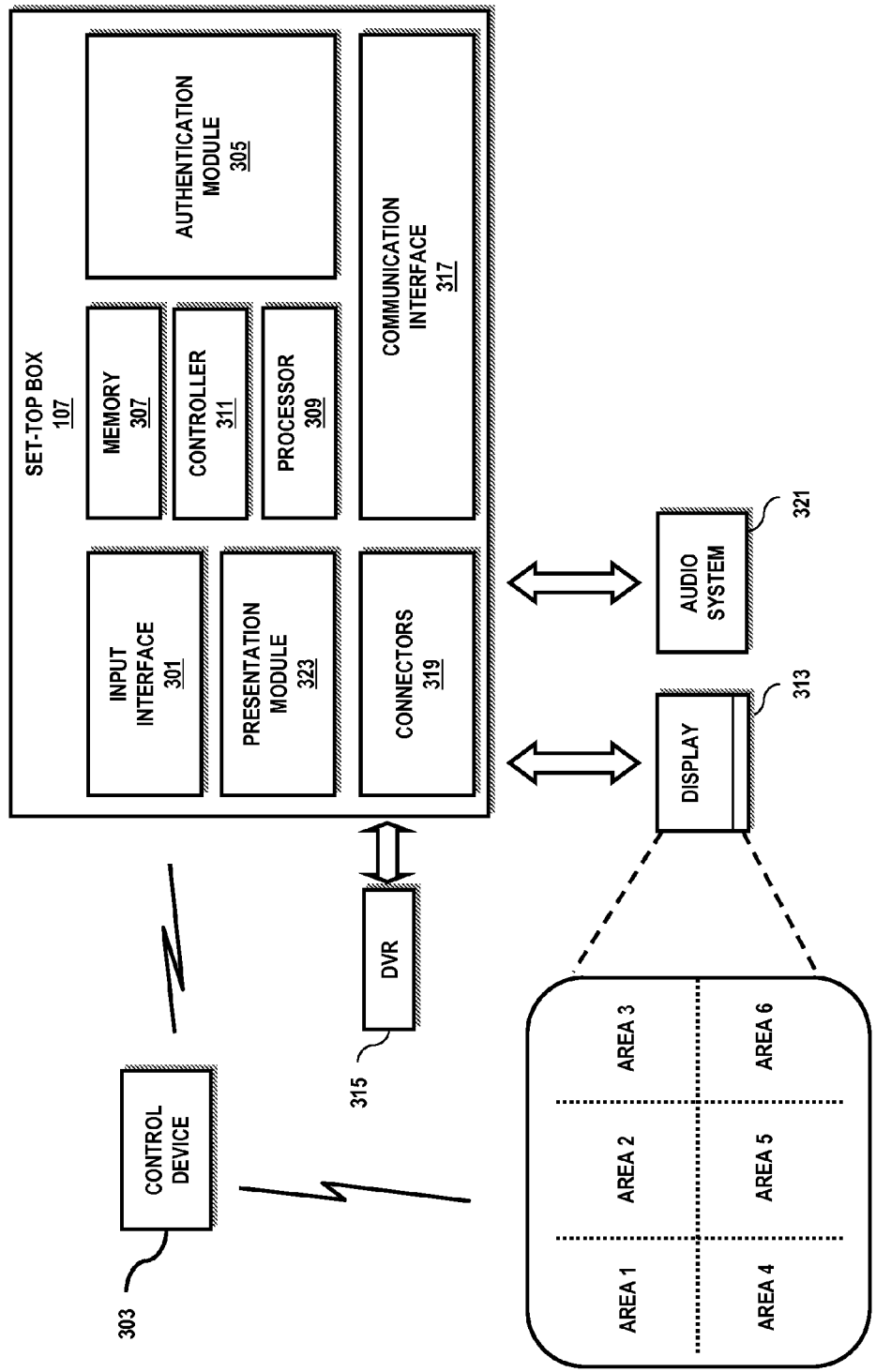
FIG. 3 is a diagram of a set-top box configured to provide authentication using user actions, according to an exemplary embodiment.

FIG. 3 is a diagram of a set-top box configured to provide authentication using user actions, according to an exemplary embodiment. Set-top box (STB) 107 may comprise any suitable technology to receive user profile information and associated passcode from the platform 119. In this example, STB 107 includes an input interface 301 that can receive input from the user via a local key pad (not shown) or a control device 303 (e.g., a remote control device). Also, an authentication module 305 resides within the STB 107 to coordinate the authentication process with the authentication platform 119. STB 107 also includes a memory 307 for storing the passcode of the user, as well as instructions that are performed by a processor 309.

Further, STB 107 may also include suitable technology to receive one or more content streams from a media source (not shown). STB 107 may comprise computing hardware and include additional components configured to provide specialized services related to the generation, modification, transmission, reception, and display of user profiles, passcodes, control commands, and/or content (e.g., user profile modification capabilities, conditional access functions, tuning functions, gaming functions, presentation functions, multiple network interfaces, AV signal ports, etc.). Alternatively, the functions and operations of STB 107 may be governed by a controller 311 that interacts with each of the STB components to configure and modify user profiles including the passcodes.

As such, STB 107 may be configured to process data streams to be presented on (or at) a display 313. Presentation of the content may be in response to a command received from control device 303 and include: displaying, recording, playing, rewinding, forwarding, toggling, selecting, zooming, or any other processing technique that enables users to select customized content instances from a menu of options and/or experience content.

STB 107 may also interact with a digital video recorder (DVR) 315, to store received content that can be manipulated by a user at a later point in time. In various embodiments, DVR 315 may be network-based, e.g., included as a part of the service provider network 125, collocated at a subscriber site having connectivity to STB 107, and/or integrated into STB 107.

Display 313 may present menus and associated content provided via STB 107 to a user. In alternative embodiments, STB 107 may be configured to communicate with a number of additional peripheral devices, including: PCs, laptops, PDAs, cellular phones, monitors, mobile devices, handheld devices, as well as any other equivalent technology capable of presenting modified content to a user, such as those computing, telephony, and mobile apparatuses described with respect to FIG. 1.

Communication interface 317 may be configured to receive user profile information from the authentication platform 119. In particular embodiments, communication interface 317 can be configured to receive content and applications (e.g., online games) from an external server (not shown). As such, communication interface 317 may optionally include single or multiple port interfaces. For example, STB 107 may establish a broadband connection to multiple sources transmitting data to STB 107 via a single port, whereas in alternative embodiments, multiple ports may be assigned to the one or more sources. In still other embodiments, communication interface 317 may receive and/or transmit user profile information (including modified content menu options, and/or modified content scheduling data).

According to various embodiments, STB 107 may also include inputs/outputs (e.g., connectors 319) to display 313 and DVR 315, as well as an audio system 321. In particular, audio system 321 may comprise a conventional AV receiver capable of monaural or stereo sound, as well as multichannel surround sound. Audio system 321 may include speakers, ear buds, headphones, or any other suitable component configured for personal or public dissemination. As such, STB 107, display 313, DVR 315, and audio system 321, for example, may support high resolution audio and/or video streams, such as high definition television (HDTV) or digital theater systems high definition (DTS-HD) audio. Thus, STB 107 may be configured to encapsulate data into a proper format with required credentials before transmitting onto one or more of the networks of FIG. 1, and de-encapsulate incoming traffic to dispatch data to display 313 and/or audio system 321.

In an exemplary embodiment, display 313 and/or audio system 321 may be configured with internet protocol (IP) capability (i.e., include an IP stack, or otherwise made network addressable), such that the functions of STB 107 may be assumed by display 313 and/or audio system 321 and controlled, in part, by content manager command(s). In this manner, an IP ready, HDTV display or DTS-HD audio system may be directly connected to one or more service provider networks 125, packet-based networks 131, and/or telephony networks 133. Although STB 107, display 313, DVR 315, and audio system 321 are shown separately, it is contemplated that these components may be integrated into a single component, or other combination of components.

An authentication module 305, in addition to supporting the described non-text based passcode scheme, may be provided at STB 107 to initiate or respond to authentication schemes of, for instance, service provider network 125 or various other content providers, e.g., broadcast television systems, and/or third-party content provider systems (not shown). Authentication module 305 may provide sufficient authentication information, e.g., a user name and passcode (e.g., sequence of user actions), a key access number, a unique machine identifier (e.g., GUID or MAC address), and the like, as well as combinations thereof, to a corresponding network interface for establishing connectivity. Further, authentication information may be stored locally at memory 307, in a repository (not shown) connected to STB 107, or at a remote repository, e.g., database 121 of FIG. 1.

A presentation module 323 may be configured to receive data streams and AV feeds and/or control commands (including user actions), and output a result via one or more connectors 319 to display 313 and/or audio system 321.

Connector(s) 319 may provide various physical interfaces to display 313, audio system 321, and the peripheral apparatuses; the physical interfaces including, for example, RJ45, RJ11, high definition multimedia interface (HDMI), optical, coax, FireWire, wireless, and universal serial bus (USB), or any other suitable connector. The presentation module 323 may also interact with control device 303 for configuring (i.e., modifying) user profiles, as well as determining particular content instances that a user desires to experience. In an exemplary embodiment, the control device 303 may comprise a remote control (or other access device having control capability, such as a joystick, video game controller, or an end terminal, e.g., a PC, wireless device, mobile phone, etc.) that provides a user with the ability to readily manipulate and dynamically modify parameters affecting user profile information and/or a multimedia experience. Such parameters can include STB 107 configuration data, such as parental controls, available channel information, favorite channels, program recording settings, viewing history, or loaded software, as well as other suitable parameters.

According to certain embodiments, control device 303 can interact with the display 313 to specify passcodes as a series of user actions. In this manner, control device 303 may include (not shown) a cursor controller, trackball, touch screen, touch pad, keyboard, joystick, and/or a key pad for selecting areas (e.g., areas 1-6) within the display. The display 313 and STB 107 can provide screen sensing (e.g., optical sensor in the remote device 303 for sensing a region within the screen of the display 313 to which the device 303 is aimed at). Alternatively, the remote control device 303 can provide remote control gestural sensing via inertial sensors for selecting the areas to specify the sequence of user actions.

Further, control device 303 may comprise a memory (not illustrated) for storing preferences (or user profile information) affecting the available content, which can be conveyed to STB 107 through an input interface 301 (or communication interface 317). Input interface 301 may support any type of wired and/or wireless link, e.g., infrared, radio frequency (RF), BLUETOOTH, and the like. Input interface 301, communication interface 317, and/or control device 303 may further comprise automatic speech recognition (ASR) and/or text-to-speech (TTS) technology for effectuating voice recognition functionality.

It is noted that the described authentication process, according to certain embodiments, can be provided as a managed service via service provider network 125, as next explained.

FIGS. 4A and 4B are flowcharts of processes for providing authentication services, according to an exemplary embodiment. Under this scenario, multiple users can subscribe to an authentication service. As such, in steps 401 and 403, passcodes (as specified in a sequence of actions, including user actions) are received by the authentication platform 119 from the subscribers, and stored within the user profile database 121. Subsequently, an application or process requests a passcode for a particular subscriber, as in step 405, from the authentication platform 119. For instance, the application can be executed by a point-of-sale terminal 109 upon a user attempting to make a purchase. In step 407, the platform 119 examines the request and extracts a user ID and locates the passcode for the specified user from the database 121. Next, in step 409, the authentication platform 119 sends the retrieved passcode to the requesting terminal 109. Thereafter, the terminal 109 can authenticate the user based on the passcode supplied from the authentication platform 119.

In addition to or in the alternative, the authentication process itself can be performed by the platform 119. Under this scenario, the terminal 109 does not perform the verification of the user itself, but merely supplies the passcode to the platform 119. As seen in FIG. 4B, the platform 119 receives an authentication request, which includes the user specified passcode and the user ID, per step 421. The platform 119 then retrieves the stored passcode for the particular user in database 121, as in step 423. Next, the process verifies the received passcode based on the stored passcode, and acknowledges a successful or failure of the verification to the terminal 109, per steps 425 and 427. That is, the verification is successful if the supplied user actions match the stored passcode. Furthermore, the processes of FIGS. 4A and 4B can both be implemented at the authentication platform 119.

FIGS. 5A-5D are graphical user interfaces (GUIs) for capturing sequences of user actions, according to various embodiments. For the purposes of illustration, a graphical user interface (GUI) 500 can be presented via any one of the devices and terminals described with respect to the system 100 of FIG. 1. As shown, an exemplary prompt 501 for the user name is provided to begin the authentication procedure. It is noted that the user name or identification can be optional, depending on the application, particularly if the sequence of actions is complex and not easily replicated. The user is prompted to provide a passcode 503.

Figure 5A:
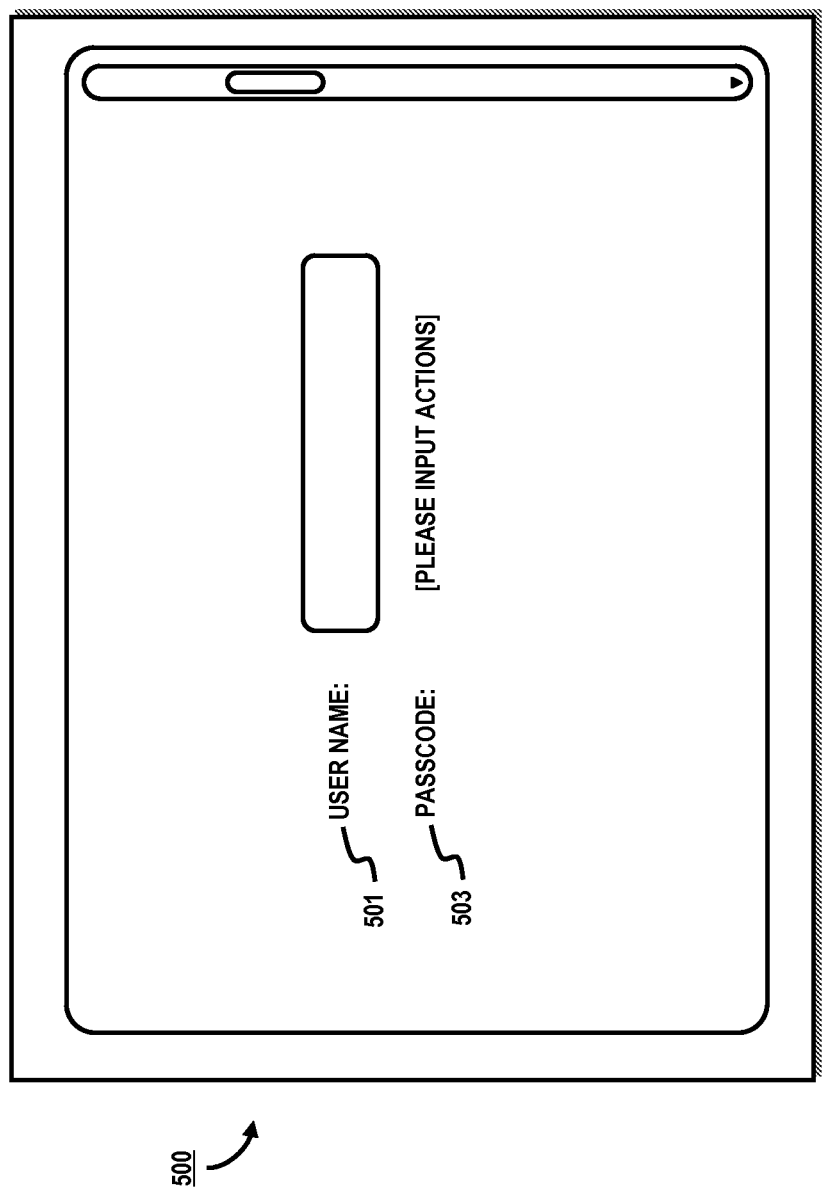
FIGS. 5A-5D are graphical user interfaces (GUIs) for capturing sequences of user actions, according to various embodiments.
Figure 5B:
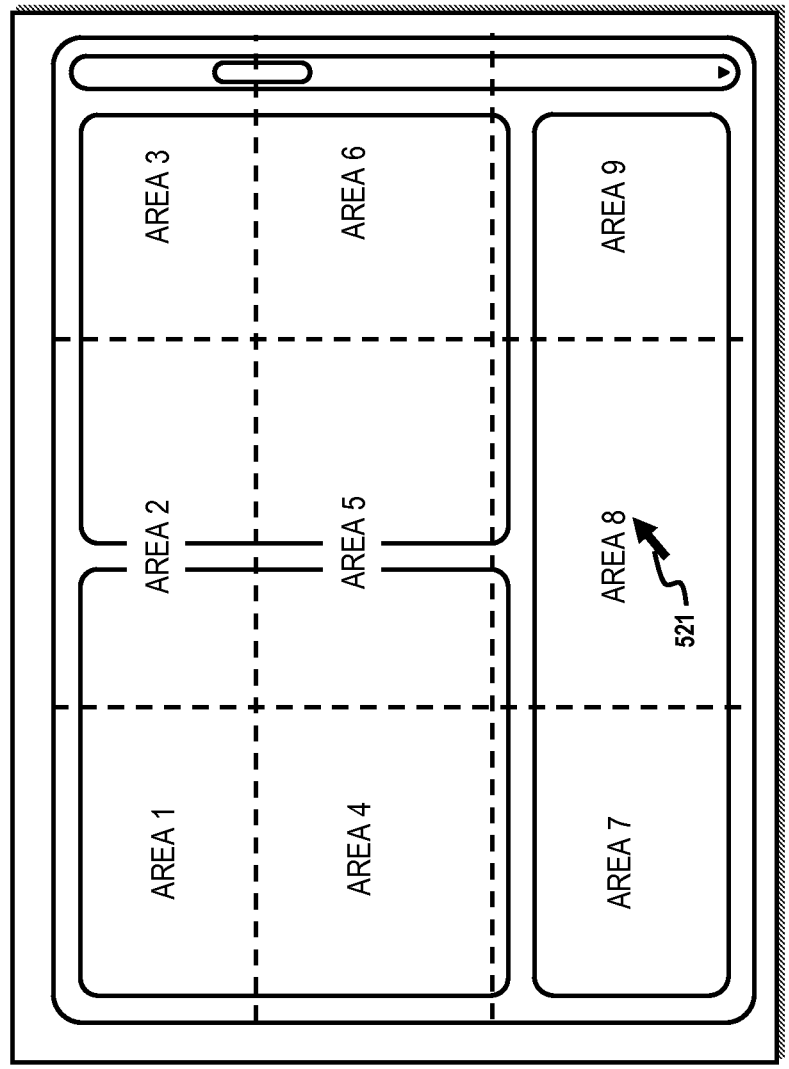

By way of example (as shown in FIG. 5B), screen 520 shows an image represented on a display that is partitioned into predetermined segments: areas 1-9. The size, shape, and number of areas can vary with the size and resolution of the display, according to certain embodiments. In this example, the display has nine areas in which the user can select using a cursor controller for manipulating cursor 521. According to certain embodiments, the grids (as shown in dashed lines) would not appear when the user is inputting the sequence of user actions. However, it is contemplated that, depending on the application, the grid may temporarily flash (for a configurable duration) to remind the user about the selection areas.

Figure 5C:
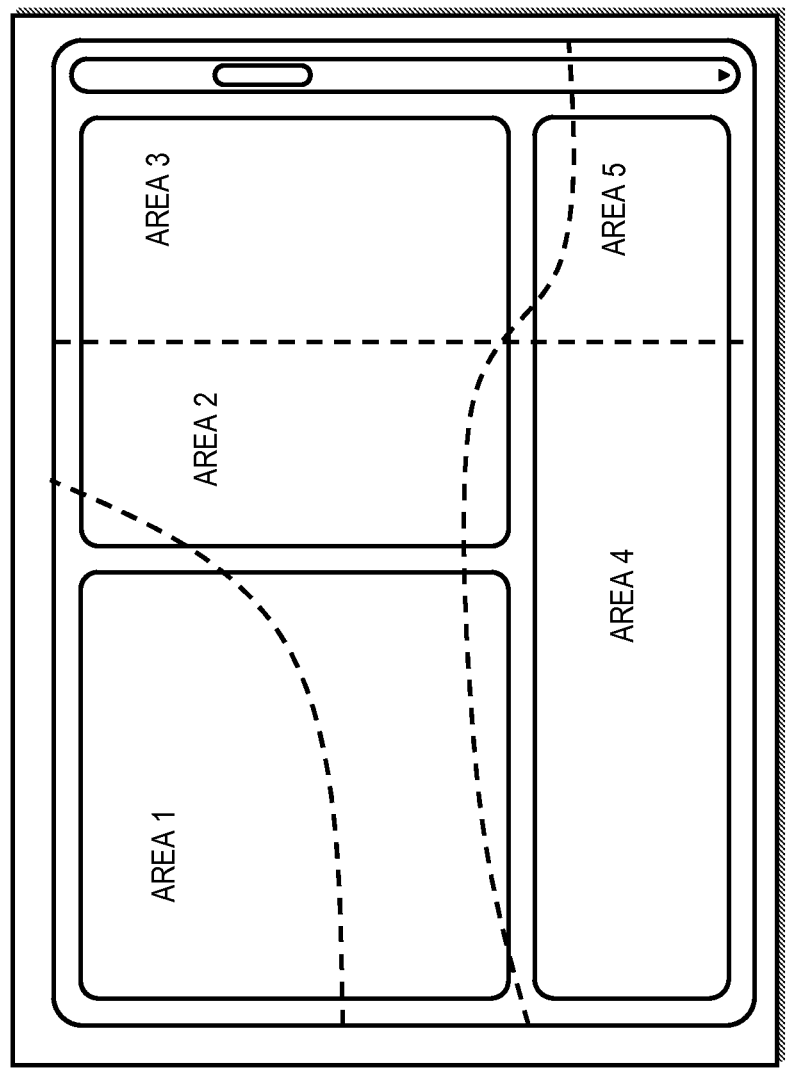

In FIG. 5C, screen 540 utilizes selectable areas that are of varying shapes, thereby strengthening the passcode. It is contemplated that the selectable areas themselves can be designed and/or specified by the user to increase the strength of the codes. Here, five selectable areas, Area 1-5, are utilized for the user to specify the passcode.

Figure 5D:
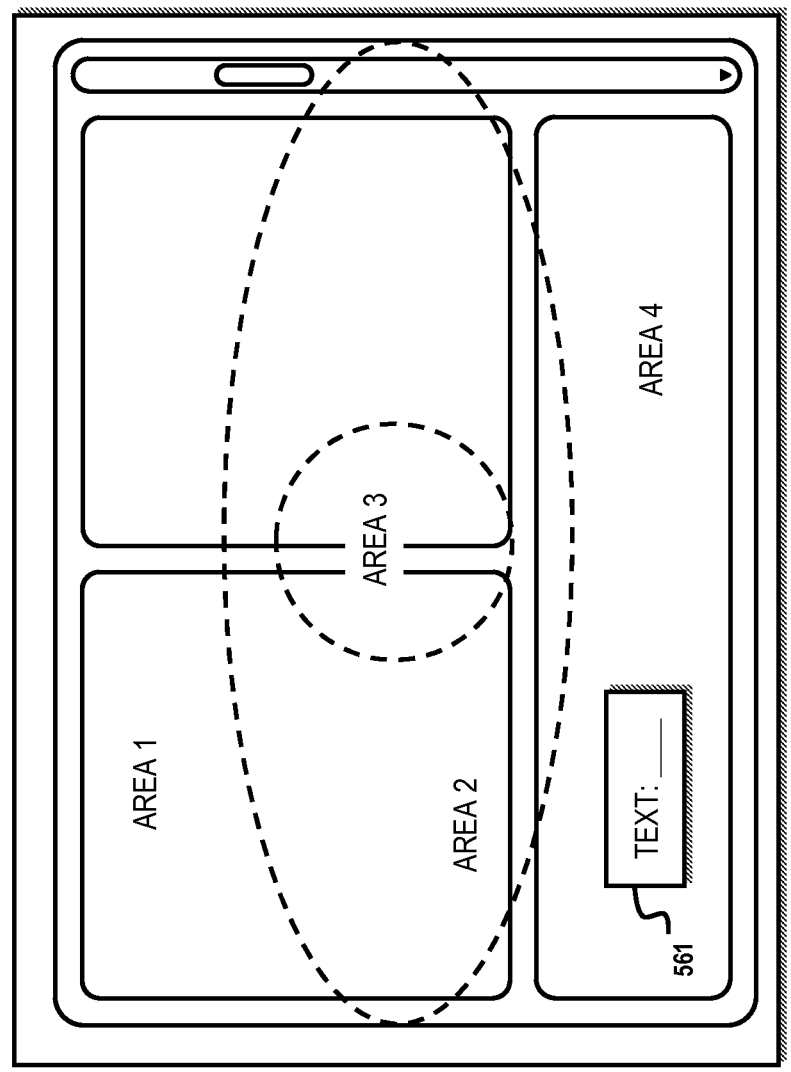

With respect to FIG. 5D, screen 560 provides a more cryptic layout for the selectable areas, thereby enhancing the strength of the passcode. The areas can be in the shape of an eye, as formed by Area 3, which is contained within Area 2. In this scenario, a text box 561 can be revealed to permit the user to enter one or more alphanumeric characters, if the passcode also includes characters.

Figure 6A:
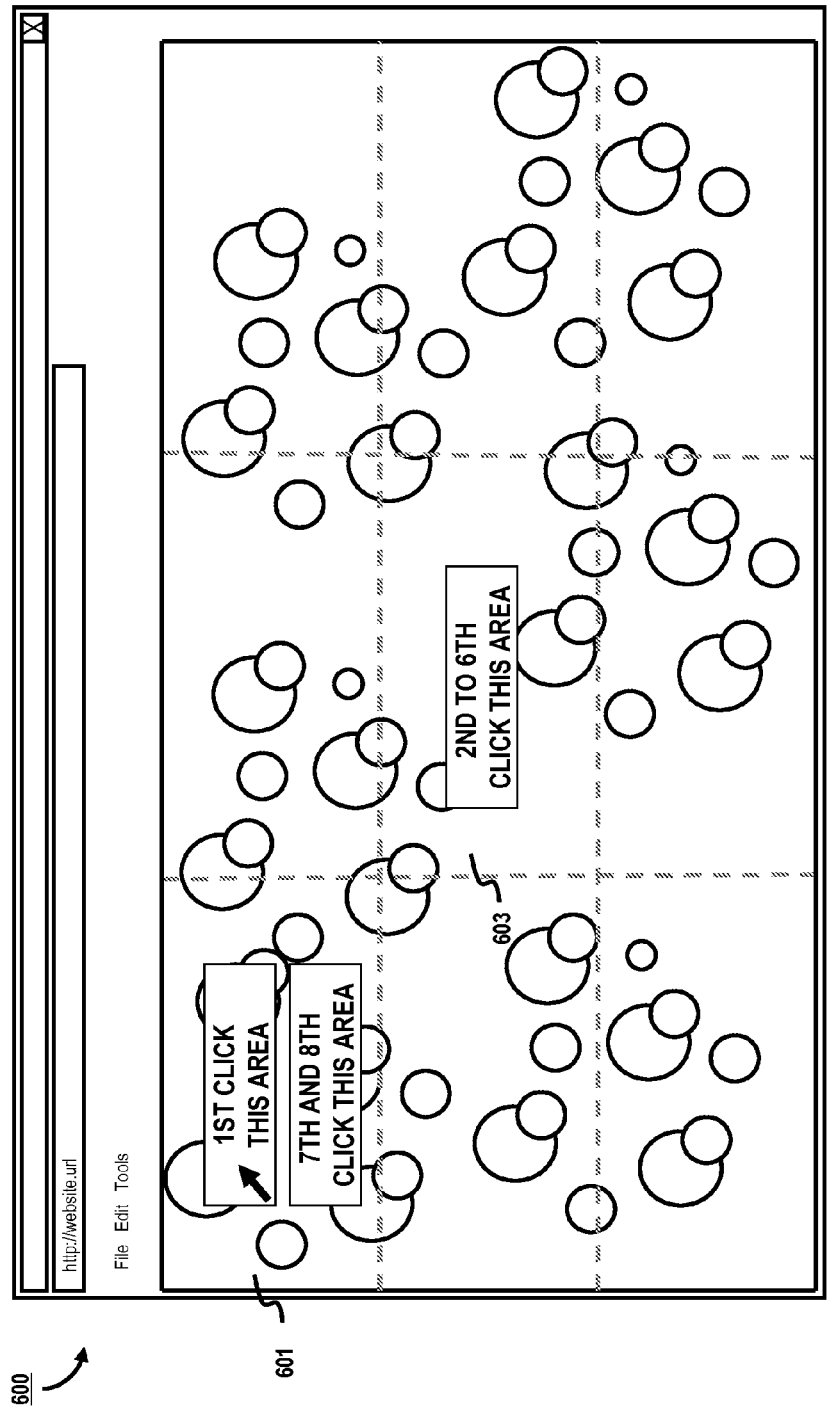
FIGS. 6A and 6B are exemplary graphical user interfaces in which various user actions can specify a passcode, according to an exemplary embodiment.
Figure 6B:
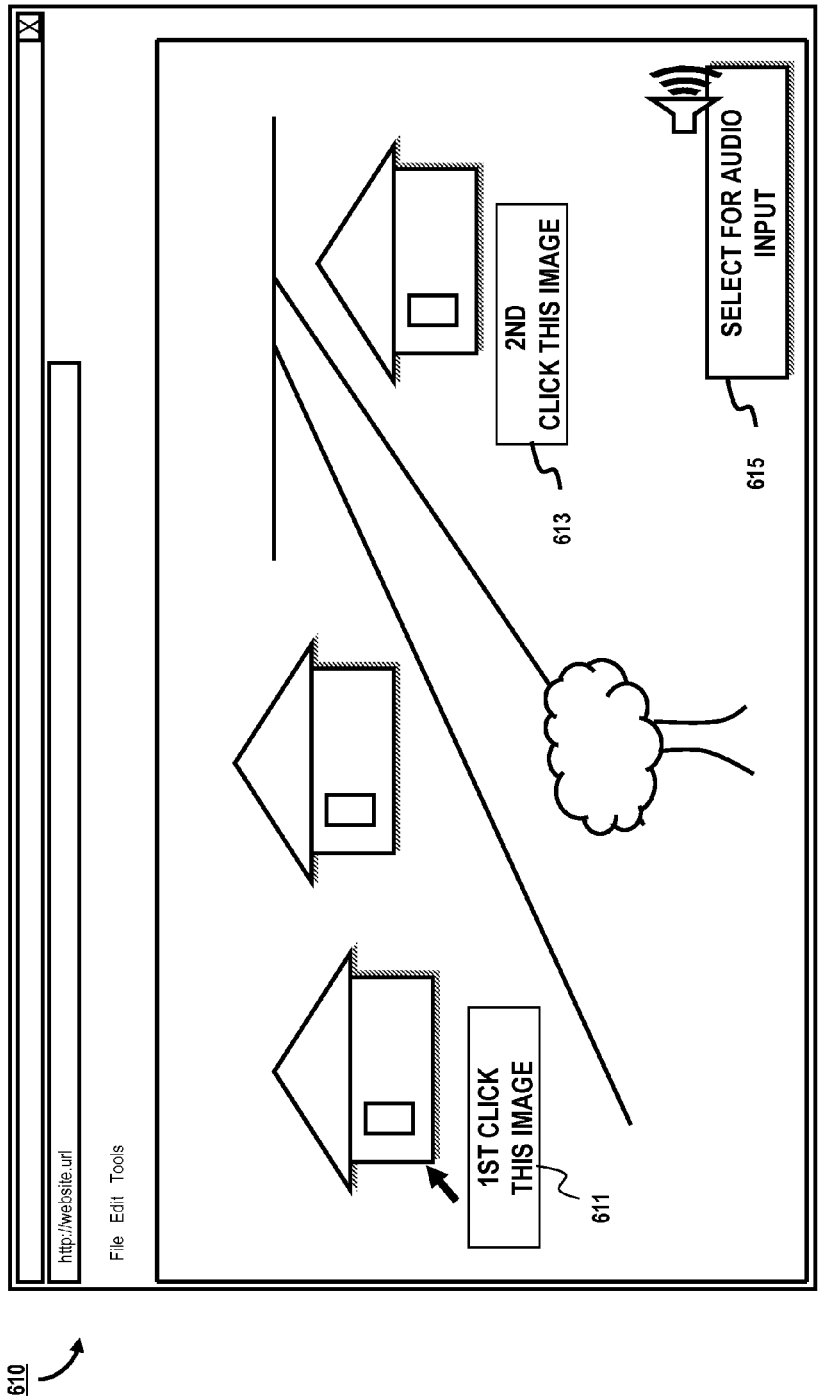

FIGS. 6A and 6B are exemplary graphical user interfaces in which various user actions can specify a passcode, according to an exemplary embodiment. As seen in FIG. 6A, GUI 600 provides for a typical image presented on a display of a computer (e.g., user device 101), and is in a "locked" state. A user can utilize a mouse to enter the passcode through actions such as clicking on the selectable areas as defined by the grids (which would not be presented in this example). In this example, the passcode is defined by eight actions. As shown, the user enters the sequence of cursor actions by first clicking (or otherwise selecting) area 601 and area 603 for the $2^{nd}$ to $6^{th}$ actions. The user then returns to area 601 to specify the $7^{th}$ and $8^{th}$ actions. As mentioned, in addition to cursor actions, other user actions can be incorporated in the passcode sequence.

In the example of FIG. 6B, GUI 610 shows a number of images in which the user can select as well as audio input to indicate a passcode. The user may have a passcode in which images 611 and 613 are selected as the first and second actions, respectively. In particular, the background of the GUI 610 can be a map with images of streets and homes; in this manner, the user can develop an even more complex passcode if the sequence of the image inputs follow a route to a favorite place, for instance. Further, the rest of the passcode can be an audio input, which can be any sound, such as a clap, whistle, speech, etc. By way of example, the GUI 610 provides an icon and text box 615 to prompt the user for the audio input.

FIG. 7 is a diagram of a mobile device with a touch screen display capable of providing user authentication, according to an exemplary embodiment. In this example, the authentication procedure may be employed by a mobile device 700 as part of a security mechanism that locks the device 700 if not in use. In particular, the user may need to be verified to unlock the device 700, as to allow operation of the device 700. For illustrative purposes, mobile device 700 is described with respect to a mobile phone, such as a cellular phone, configured to provide a GUI 701 in which the user can enter a passcode using either the touch screen capability of the display 703, as well as cursor buttons 705, and keypad 707.

According to one embodiment, GUI 701 is partitioned into four selectable areas, in which the user can simply select by touching the area on the display 703. For instance, assuming the passcode involves four actions, the first action is specified by touching area 709, and the second action is input by depressing a button 711 on the key pad 707. Next, the user touches area 713 twice.

The mobile device 700 can then verify whether the user is authorized to operate the functions of the device 700 by determining whether the input sequence of actions coincide with a stored pattern of actions.

Alternatively, the verification can be executed by the authentication platform 119, which is maintained by a service provider. That is, the verification can be performed as part of a managed service by the service provider.

It is noted that if the authentication is unsuccessful or the user has forgotten the passcode, the mobile device 700 may permit the user to attempt inputting the passcode according to a pre-determined number of times (e.g., 3 times) before locking the user out. Also, this period for locking the user out can be configurable. As for recovery of the passcode, a separate mechanism can be utilized; e.g., an email can be sent to the user to remind the user of the passcode, or to create a new one.

The processes described herein for providing user authentication may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
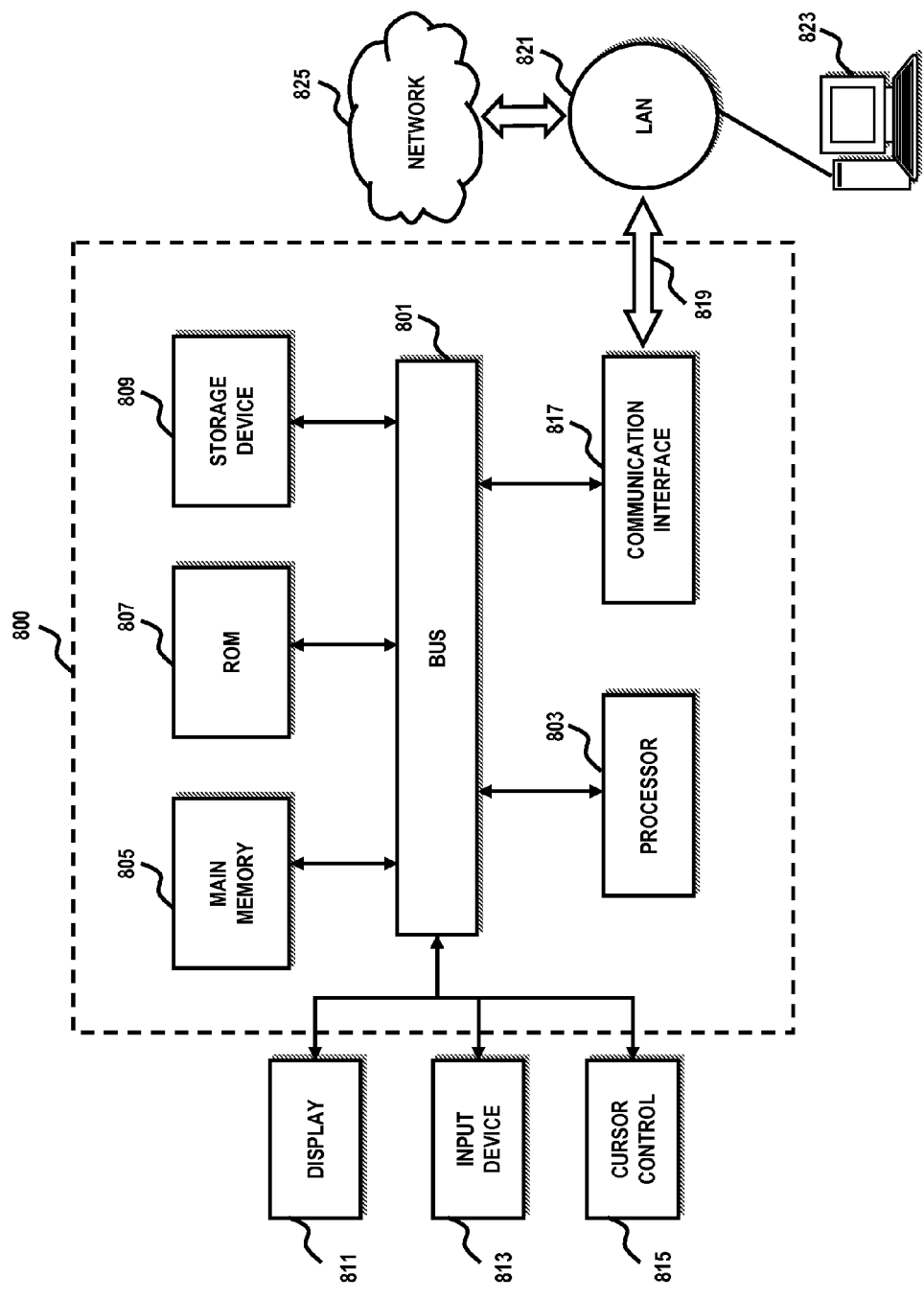
FIG. 8 is a diagram of a computer system that can be used to implement various exemplary embodiments.

FIG. 8 illustrates computing hardware (e.g., computer system) 800 upon which exemplary embodiments can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   initiating prompting on a display for an input to authenticate a user;
   receiving the input as a sequence of user actions, wherein user actions include one or more user gestures and an audio input;
   determining one or more of a plurality of areas defined by a graphical user interface presented on the display according to each of the user actions, wherein at least one of the determined areas is contained within at least one of the other determined areas;
   retrieving, by a processor, a predetermined sequence associated with the user and a subscription based authentication service from an authentication platform of the authentication service, wherein the predetermined sequence is created with a device that is independent of the display as part of the subscription based authentication service and prior to receiving the input;
   comparing the received sequence with the predetermined sequence to determine a match; and
   declaring the user to be authenticated based on the comparison.

2. A method according to claim 1,
   wherein the processor and platform declare the user to be authenticated, and the predetermined sequence is defined by the determined areas.

3. A method according to claim 2, wherein the predetermined sequence includes a selection of one or more images and the audio input, and the plurality of areas are designed and specified by the user.

4. A method according to claim 1, further comprising:
   presenting, for a configurable duration, a plurality of grids associated with the predetermined sequence on the display,
   wherein the user actions are at least in part provided via an input device including a mouse, a touch pad, or a cursor controller.

5. A method according to claim 4, wherein the display is a touch screen display, the user actions are inputted through one or more of the plurality of areas, and the plurality of areas are selectable and of varying shapes.

6. A method according to claim 4, wherein the user actions provided via the input device include a pattern of movements associated with a sport, a pattern of movements associated with a video game, a pattern of movements associated with musical notes, or a combination thereof.

7. A method according to claim 4, wherein the one or more user gestures include a pattern of movements associated with a sport, a pattern of movements associated with a video game, a pattern of movements associated with musical notes, or a combination thereof.

8. A method according to claim 1, wherein at least one of the user actions is associated with an action of an input device, the input device action including a left mouse click and a right mouse click.

9. A method according to claim 1, wherein the predetermined sequence is retrieved from a local memory or remotely from a database over a communication network, and wherein the predetermined sequence is associated with the authentication service via a service provider of the authentication platform.

10. A method according to claim 1, wherein the audio input includes a clap, a whistle, or speech.

11. A method according to claim 1, wherein the one or more user gestures include a clap, a whistle, or speech.

12. An apparatus comprising:
    a processor configured to initiate prompting on a display for an input to authenticate a user, and to receive the input as a sequence of user actions including one or more user gestures and an audio input,
    wherein the processor is further configured to determine one or more of a plurality of areas defined by a graphical user interface presented on the display according to each of the user actions, wherein at least one of the determined areas in contained within at least one of the other determined areas; to retrieve a predetermined sequence associated with the user and a subscription based authentication service from an authentication platform of the authentication service, wherein the predetermined sequence is created with a device that is independent of the display as part of the subscription based authentication service and prior to receipt of the input; to compare the received sequence with the predetermined sequence to determine a match; and to declare the user to be authenticated based on the comparison.

13. An apparatus according to claim 12, wherein the processor and platform declare the user to be authenticated, and the predetermined sequence is defined by the determined areas.

14. An apparatus according to claim 13, wherein the predetermined sequence is transferred to the apparatus from the device independent of the display and includes a selection of one or more images and the audio input.

15. An apparatus according to claim 12, wherein the user actions are at least in part provided via an input device including a mouse, a touch pad, or a cursor controller.

16. An apparatus according to claim 15, wherein the apparatus is a set-top box and the display is a touch screen display, and the user actions are inputted through the touch screen display.

17. An apparatus according to claim 12, wherein the authentication platform also declares the user to be authenticated and at least one of the user actions is associated with an action of an input device, the input device action including a left mouse click and a right mouse click.

18. An apparatus according to claim 12, wherein the predetermined sequence is retrieved from a local memory or remotely from a database over a communication network.

19. An apparatus comprising:
a display;
a processor configured to initiate prompting on the display for an input to authenticate a user, and to receive the input as a sequence of user action including one or more user gestures and an audio input; and
a memory configured to store a predetermined sequence associated with the user and a subscription based authentication service,
wherein the processor is further configured to determine one or more of a plurality of areas defined by a graphical user interface presented on the display according to each of the user actions, wherein at least one of the determined areas is contained within at least one of the other determined areas; to retrieve the predetermined sequence from an authentication platform of the authentication service; to compare the received sequence with the predetermined sequence to determine a match; and to declare the user to be authenticated based on the comparison; and
wherein the predetermined sequence is created with a device that is independent of the display prior to receipt of the input.

20. An apparatus according to claim 19, further comprising:
a communication interface configured to communicate over a communication network with a database configured to store a plurality of predetermined sequences for, respectively, a plurality of users,
wherein the predetermined sequence is retrieved from the memory or from the database, and the predetermined sequence includes gestures and an audio input.

* * * * *